United States Patent
Kakutani

(10) Patent No.: US 10,755,152 B2
(45) Date of Patent: Aug. 25, 2020

(54) IMAGE FORMING SYSTEM, IMAGE FORMING DEVICE, AND IMAGE FORMING METHOD

(71) Applicant: SEIKO EPSON CORPORATION, Tokyo (JP)

(72) Inventor: Toshiaki Kakutani, Nagano (JP)

(73) Assignee: Seiko Epson Corporation, Tokyo (JP)

(*) Notice: Subject to any disclaimer, the term of this patent is extended or adjusted under 35 U.S.C. 154(b) by 2 days.

(21) Appl. No.: 15/868,094

(22) Filed: Jan. 11, 2018

(65) Prior Publication Data
US 2018/0218246 A1     Aug. 2, 2018

(30) Foreign Application Priority Data

Jan. 27, 2017   (JP) ................. 2017-012912

(51) Int. Cl.
| | | |
|---|---|---|
| G06K 15/02 | (2006.01) | |
| H04N 1/60 | (2006.01) | |
| H04N 1/405 | (2006.01) | |
| G06K 15/10 | (2006.01) | |
| H04N 1/41 | (2006.01) | |
| H04N 1/409 | (2006.01) | |

(52) U.S. Cl.
CPC ....... *G06K 15/1881* (2013.01); *G06K 15/102* (2013.01); *H04N 1/4051* (2013.01); *H04N 1/4057* (2013.01); *H04N 1/4092* (2013.01); *H04N 1/41* (2013.01); *H04N 1/6027* (2013.01)

(58) Field of Classification Search
None
See application file for complete search history.

(56) References Cited

U.S. PATENT DOCUMENTS

| | | | |
|---|---|---|---|
| 8,712,165 B2* | 4/2014 | Mita ................ | G06K 9/38 358/2.1 |
| 8,777,355 B2* | 7/2014 | Kagata ................ | B41J 2/2107 347/14 |
| 2016/0173724 A1 | 6/2016 | Kakutani et al. | |

FOREIGN PATENT DOCUMENTS

| | | |
|---|---|---|
| JP | 4375050 B2 | 12/2009 |
| JP | 4375071 B2 | 12/2009 |
| JP | 4375398 B2 | 12/2009 |
| JP | 2016-116105 A | 6/2016 |

* cited by examiner

*Primary Examiner* — Alejandro Valencia
(74) *Attorney, Agent, or Firm* — Global IP Counselors, LLP

(57) ABSTRACT

An image forming system that classifies a block formed by Nb pixels included in image data into Nt groups including a group including a pixel of a highest gradation value and a group including a pixel of a lowest gradation value, generates, for at least one of the Nt groups, positional information that is information indicating positions of pixels that form the corresponding group, determines a block gradation value in accordance with a data amount that is smaller than a data amount that is used for expressing gradation values of the Nb pixels for each of the Nt groups as a target, based on a gradation value for each of pixels that form each group, tentatively determines, determines, for the block as a target, the dot arrangement using the tentatively determined dot arrangement and the positional information, and forms an image using the determined dot arrangement.

13 Claims, 12 Drawing Sheets

| B1 | | | | B2 | | | | |
|---|---|---|---|---|---|---|---|---|
| 240 | 240 | 240 | 240 | 255 | 255 | 12 | 3 | 2 |
| 241 | 241 | 243 | 240 | 255 | 12 | 5 | 15 | 11 |
| 255 | 255 | 255 | 255 | 255 | 51 | 25 | 62 | 23 |

| REPRESENTATIVE VALUE | UPPER 4 PIXEL DOT ARRANGEMENTS | | | | LOWER 4 PIXEL DOT ARRANGEMENTS | | | | NUMBER OF ON DOTS | | | BLOCK GRADATION VALUE |
|---|---|---|---|---|---|---|---|---|---|---|---|---|
| | th0 | th1 | th2 | th3 | th4 | th5 | th6 | th7 | S dot | M dot | L dot | |
| 0 – 1 | | | | | | | | | 0 | 0 | 0 | 0 |
| 2 – 5 | S | | | | | | | | 1 | 0 | 0 | 1 |
| 6 – 11 | S | | | | | | | S | 2 | 0 | 0 | 2 |
| 12 – 31 | S | | | S | | | | S | 3 | 0 | 0 | 3 |
| 32 – 49 | S | | | S | | | S | S | 4 | 0 | 0 | 4 |
| 50 – 54 | S | | | S | | S | S | S | 5 | 0 | 0 | 5 |
| 55 – 69 | S | | | S | S | S | S | S | 6 | 1 | 0 | 6 |
| 70 – 71 | M | | | S | S | S | S | S | 5 | 2 | 0 | 7 |
| 72 – 74 | M | | | M | S | S | S | M | 4 | 3 | 0 | 8 |
| 75 – 87 | M | | | M | S | S | M | M | 3 | 4 | 0 | 9 |
| 88 – 100 | M | | | M | M | M | M | M | 2 | 5 | 0 | 10 |
| 101 – 103 | M | M | | M | M | M | M | M | 1 | 6 | 0 | 11 |
| 104 – 121 | M | M | | M | M | M | M | M | 0 | 7 | 0 | 12 |
| 122 – 128 | M | M | | M | M | M | M | M | 0 | 6 | 1 | 13 |
| 129 – 131 | L | M | | M | M | M | M | L | 0 | 5 | 2 | 14 |
| 132 – 137 | L | M | | L | M | M | L | L | 0 | 4 | 3 | 15 |
| 138 – 155 | L | M | | L | M | L | L | L | 0 | 3 | 4 | 16 |
| 156 – 173 | L | M | | L | L | L | L | L | 0 | 2 | 5 | 17 |
| 174 – 178 | L | | | L | L | L | L | L | 0 | 1 | 6 | 18 |
| 179 – 198 | L | | | L | L | L | L | L | 0 | 0 | 7 | 19 |
| 199 – 246 | L | | | L | L | L | L | L | 0 | 0 | 7 | 20 |
| 247 – 255 | L | | L | L | L | L | L | L | 0 | 0 | 8 | 21 |

FIG. 9
| 2 | 166 | 241 | 19 |
|---|---|---|---|
| 101 | 114 | 8 | 59 |
FIG. 10
| L |   |   | L |
|---|---|---|---|
| S |   | L | M |
FIG. 11
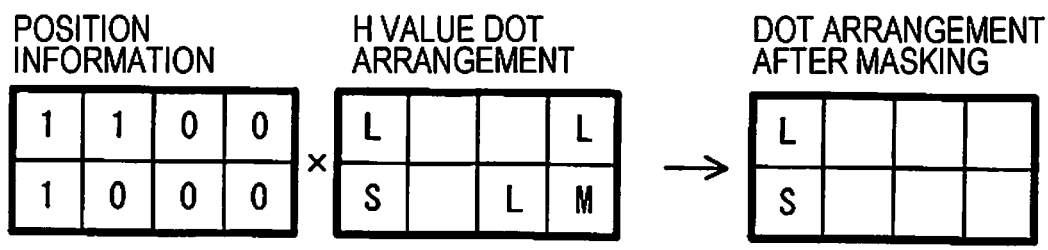
FIG. 12
| S |   |   | S |
|---|---|---|---|
|   |   | S |   |
FIG. 13
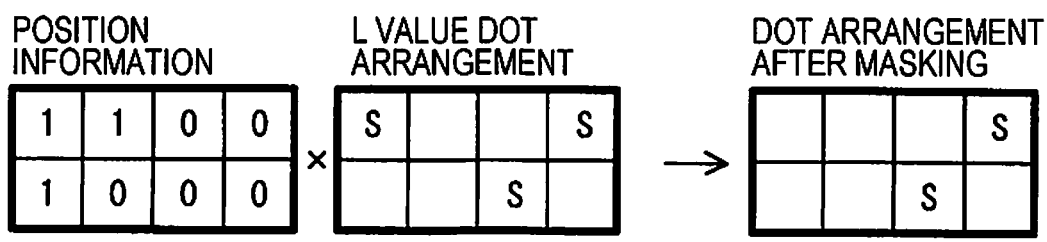

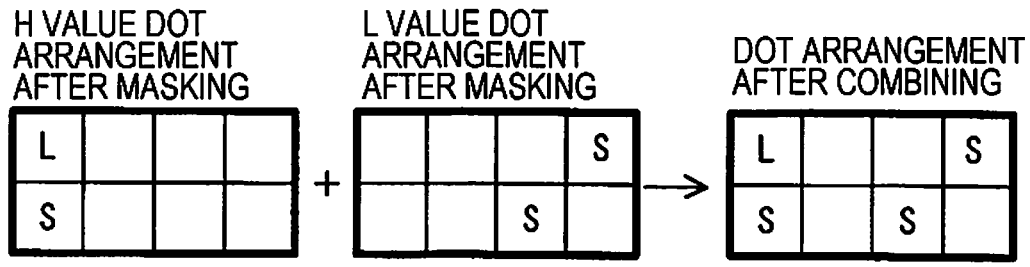

FIG. 18

| 13 | 6 | 10 | 14 |
|---|---|---|---|
| 9 | ① | ② | 7 |
| 5 | 4 | 3 | 11 |
| 16 | 12 | 8 | 15 |

FIG. 19

| 13 | 6 | 10 | 14 |
|---|---|---|---|
| 9 | ① | ② | 7 |
| 5 | 4 | ③ | 11 |
| 16 | 12 | 8 | 15 |

FIG. 20

| ⑬ | ⑥ | ⑩ | ⑭ |
|---|---|---|---|
| ⑨ | ① | ② | ⑦ |
| ⑤ | ④ | ③ | ⑪ |
| 16 | ⑫ | ⑧ | 15 |

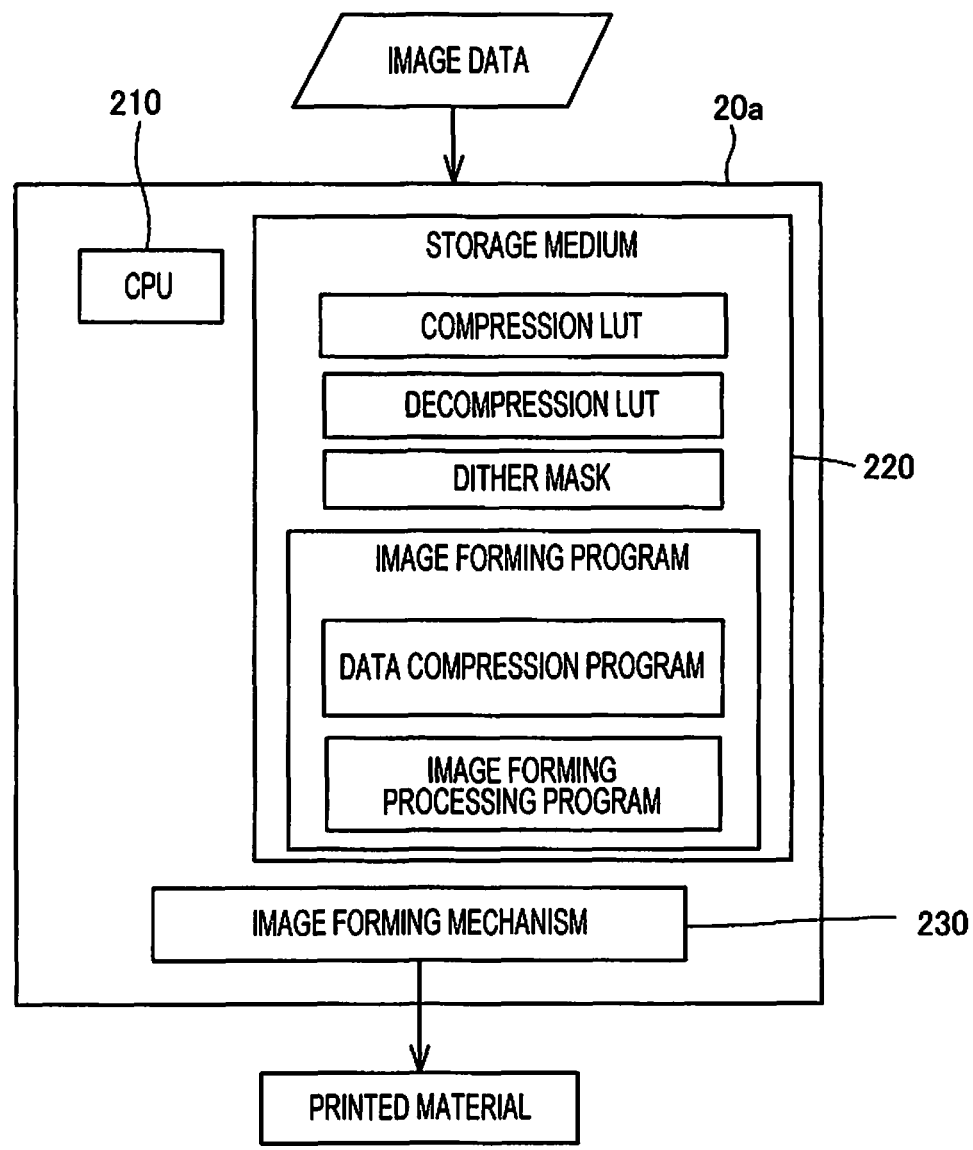

IMAGE FORMING SYSTEM, IMAGE FORMING DEVICE, AND IMAGE FORMING METHOD

BACKGROUND

1. Technical Field

The present invention relates to image formation.

2. Related Art

Japanese Patent No. 4375398 describes the following contents as a method for determining in which pixel a dot is to be formed. Pixels are divided into pixel groups (blocks) each including a predetermined number of pixels, and a pixel group gradation value representative of each pixel group is determined. Subsequently, by referring to the correspondence relation where the pixel group gradation values and multivalue conversion resultant values (block gradation values) determined by multivalue-converting the pixel group gradation values are set for each pixel group, the pixel group gradation values are converted into a multivalue format. Thus, the multivalue resultant values determined for each pixel group are supplied as control data for an image output device. The image output device determines whether a dot is to be formed for each pixel in a pixel group, based on the supplied control data, and forms dots on an output medium to output an image. Japanese Patent No. 4375050 and Japanese Patent No. 4375071 also describe similar contents.

SUMMARY

In the above-described related art, one block gradation value is determined for each block. Therefore, if there is an edge in a block, there may be a case in which image quality is deteriorated.

An advantage of some aspects of the invention is that, in a technology of performing halftone processing using a block gradation value, deterioration of image quality is reduced.

An embodiment of the present disclosure is an image forming system including a classifying section that classifies a block formed by Nb pixels included in image data into Nt (Nt is an integer which satisfies $2 \leq Nt < Nb$) groups including a group including a pixel of a highest gradation value and a group including a pixel of a lowest gradation value, a positional information generation section that generates, for at least one of the Nt groups, positional information that is information indicating positions of pixels that form the corresponding group, a block gradation value determination section that determines a block gradation value in accordance with a data amount that is smaller than a data amount that is used for expressing gradation values of the Nb pixels for each of the Nt groups as a target, based on a gradation value for each of pixels that form each group, a tentative determination section that tentatively determines, for each of the Nt groups as a target, a dot arrangement that is information indicating whether or not a dot is formed for each of pixels that form the block, based on the block gradation value, a dot arrangement determination section that determines, for the block as a target, the dot arrangement using the tentatively determined dot arrangement and the positional information, and an image forming section that forms an image using the determined dot arrangement. According to this embodiment, the dot arrangements, each of which has been tentatively determined for the corresponding one of the groups, are combined using the positional information, and therefore, deterioration of image quality is reduced.

In the above-described embodiment, the block gradation value determination section may be configured to determine the block gradation value of each of the Nt groups, based on a representative value of gradation values stored in pixels that form the corresponding group. According to this embodiment, it is not necessary to determine a block gradation value for each of the pixels that form the corresponding group, and therefore, a processing load is reduced.

In the above-described embodiment, the tentative determination section may be configured to tentatively determine the dot arrangement using an order of priories for forming a dot for the pixels that form the block. According to this embodiment, speed of tentatively determining a dot arrangement is increased by determining the order of priorities in advance.

In the above-described embodiment, a total of a data amount of the block gradation value and a data amount of the positional information may be smaller than a data amount of the dot arrangement for the Nb pixels. According to this embodiment, if the block gradation value and the positional information are transferred, image forming speed is hardly reduced due to transfer speed.

In the above-described embodiment, the classifying section may be configured so as not to execute, if an edge is not included in the block, the classifying, and the dot arrangement determination section may be configured so as to determine, if an edge is not included in the block, the dot arrangement, based on the block gradation value. According to this embodiment, if an edge is not included in the block, a processing load is reduced and the data amount of data in accordance with the block gradation value and the position information is reduced.

In the above-described embodiment, the image forming system may further includes a determination section that determines whether or not an edge is included in the block, based on gradation values stored in the pixels that form the block and comparison with a corresponding threshold that has been determined in advance. According to this embodiment, the determining is performed based on comparison with the threshold that has been determined in advance, and therefore, the determining may be executed in a simple manner.

The tentative determination section may be configured not to execute, if an edge is not included in the block, the tentative determining, and the block gradation value determination section may be configured to regard, if an edge is not included in the block, the Nt as 1. According to this embodiment, the processing load is further reduced.

In the above-described embodiment, the positional information may be configured to indicate whether or not a pixel belongs to a group of the Nt groups to which a representative pixel belongs, for other pixels than the representative pixel among the pixels that form the block. According to this embodiment, a data amount of the positional information is smaller by a data amount of the representative pixel.

The present disclosure may be realized by various embodiments other than the above-described embodiment. For example, the present disclosure may be realized by an embodiment of an image forming method, an image forming device that realizes the method, a program that realizes the method, a storage medium, not a temporary storage medium, which stores the program, or the like.

BRIEF DESCRIPTION OF THE DRAWINGS

The invention will be described with reference to the accompanying drawings, wherein like numbers reference like elements.

FIG. 8 is a table illustrating a relationship between a representative value, a block gradation value, and the like.

FIG. 9 is a view illustrating a threshold applied to each pixel of a block of interest.

FIG. 10 is a view illustrating dots of an H value group, which are arranged.

FIG. 11 is a view illustrating masking of the H value group.

FIG. 12 is a view illustrating dots of an L value group, which are arranged.

FIG. 13 is a view illustrating masking of the L value group.

FIG. 14 is a view illustrating how dot arrangements are combined.

FIG. 15 is a view illustrating gradation values of an ink color in image data (a second embodiment).

FIG. 16 is a view illustrating a relationship between gradation values and a density pattern (the second embodiment).

FIG. 17 is a view illustrating dots that occur when the gradation value is 1.

FIG. 18 is a view illustrating dots that occur when the gradation value is 2.

FIG. 19 is a view illustrating dots that occur when the gradation value is 3.

FIG. 20 is a view illustrating dots that occur when the gradation value is 14.

FIG. 24 is a view illustrating a dot arrangement (a comparison example).

FIG. 25 is a schematic diagram of a printer (a third embodiment).

DESCRIPTION OF EXEMPLARY EMBODIMENTS

First Embodiment

Figure 1:
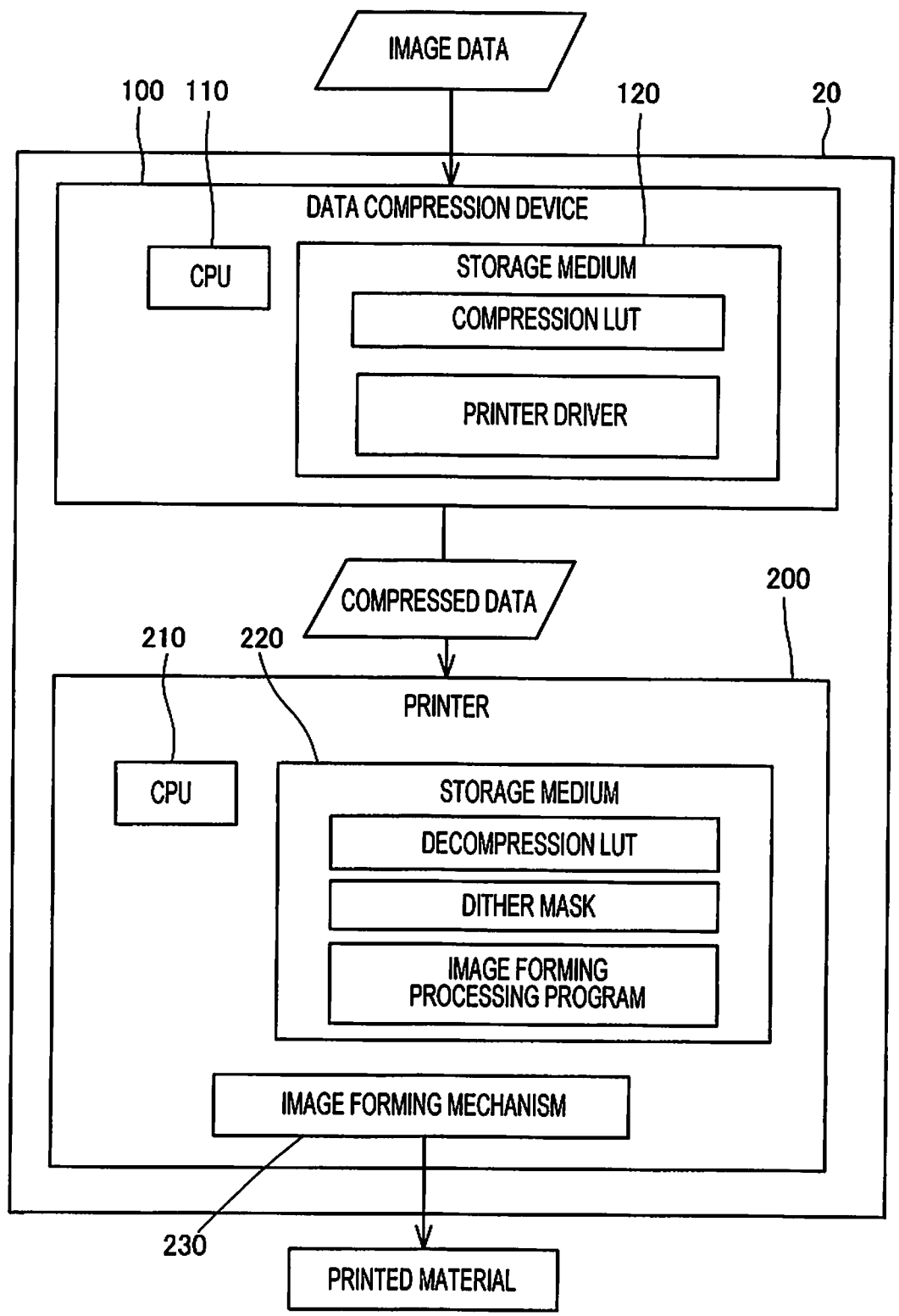
FIG. 1 is a schematic diagram of an image forming system.

FIG. 1 is a schematic diagram illustrating an outline of an image forming system 20. The image forming system 20 includes a data compression device 100 and a printer 200. The data compression device 100 coverts image data and thus generates compressed data. The compressed data is intermediate data that is obtained in the course of halftone processing of the image data. The data compression device 100 transmits the compressed data to the printer 200. The image forming system 20 includes the data compression device 100 and thus functions as a data compression system.

The data compression device 100 in this embodiment is a personal computer. The data compression device 100 includes a CPU 110 and a storage medium 120. In the storage medium 120, a compression LUT and a printer driver are stored. The storage medium 120 includes an RAM and executes temporary storing for execution of the printer driver.

The printer 200 is an image forming device. The printer 200 includes a CPU 210, a storage medium 220, and an image forming mechanism 230. In the storage medium 220, a decompression LUT, a dither mask, and an image forming processing program are stored. The storage medium 220 includes an RAM and executes temporary storing for execution of the image forming processing program.

The image forming mechanism 230 is a generic name of hardware used for ink jet image formation. The image forming mechanism 230 includes a print head or the like. A resolution of image formation performed by the printer 200 is 1200 dpi. Ink colors used by the printer 200 are cyan (C), magenta (M), yellow (Y), and black (K). The printer 200 is able to select a size of each of dots formed on a print medium from large, medium, and small.

Figure 2:
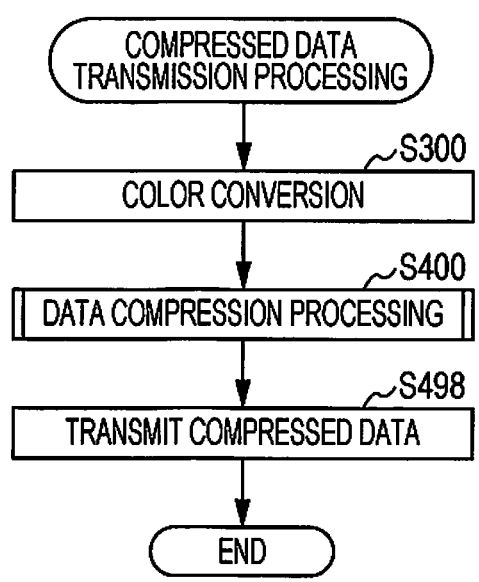
FIG. 2 is a flowchart illustrating compressed data transmission processing.

FIG. 2 is a flowchart illustrating compressed data transmission processing. The CPU 110 executes a stored program, and thereby, the data compression device 100 is realized. This program is a printer driver.

The compressed data is generated from image data represented by RGB values. The resolution of the image data in this embodiment is 1200 dpi. For the image data, data indicating a gradation value is stored in each pixel. A gradation value in this embodiment is an integer value of 0 to 255. Therefore, the image data has, for each pixel, a data amount of 8 bits for each of RGB, that is, a data amount of 24 bits.

When compressed data transmission processing is started, color conversion is executed (S300). That is, the RGB values are converted to CMYK values of ink color components. Each of the CMYK values takes an integer value of 0 to 255. Thereafter, similar processing is independently performed for each ink color component. Subsequently, data compressed processing is executed for each ink color component (S400), compressed data is transmitted (S498), and compressed data transmission processing is terminated.

Figure 3:
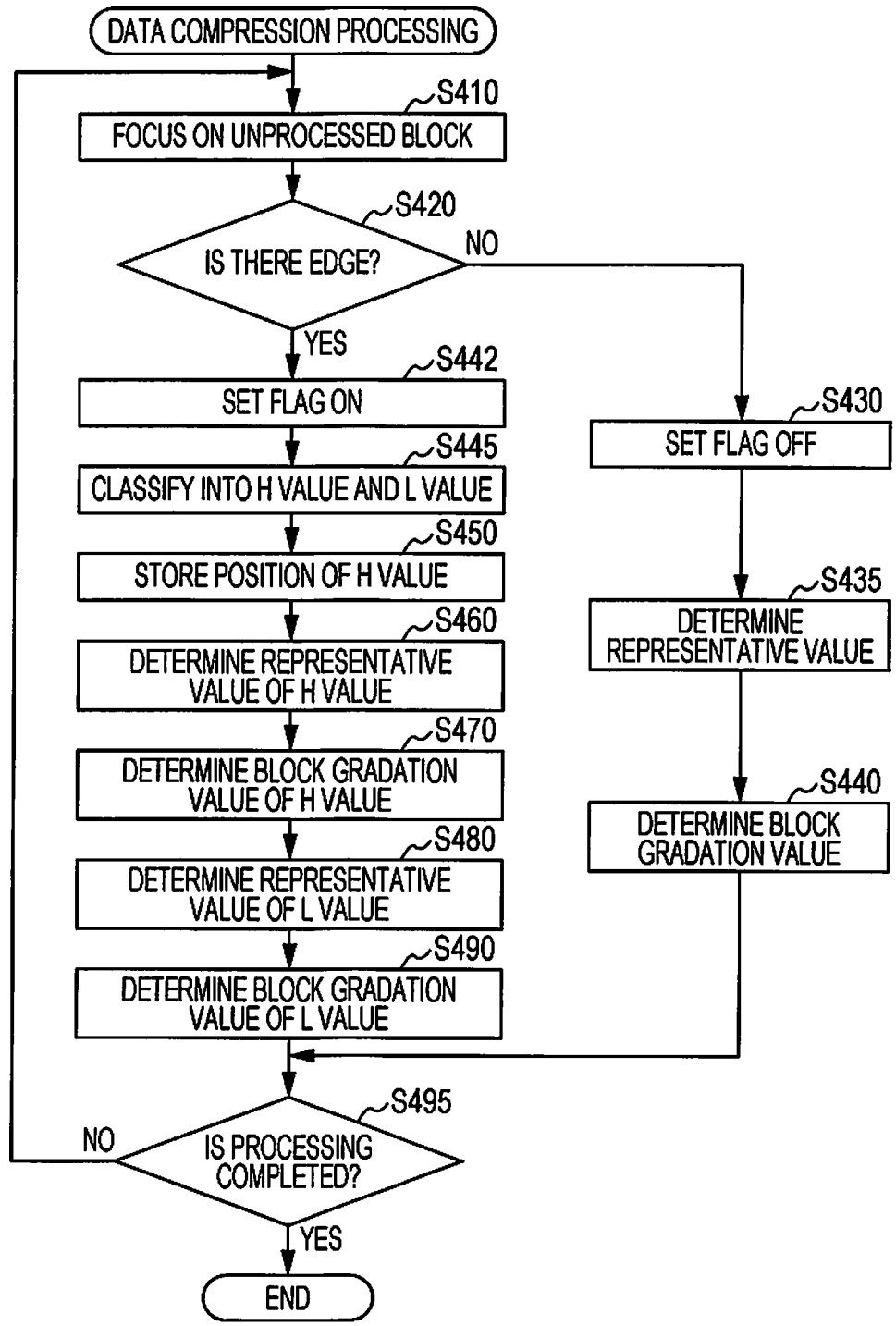
FIG. 3 is a flowchart illustrating data compression processing.

FIG. 3 is a flowchart illustrating single ink color component data compression processing. First, one of unprocessed blocks is focused on (S410).

Figures 4, 5:
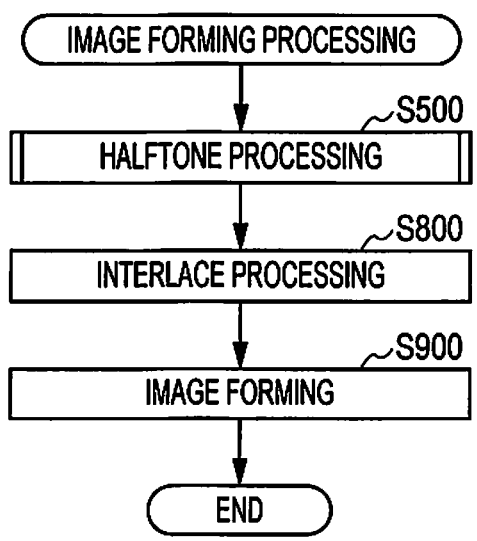
FIG. 4 is a view illustrates blocks.
FIG. 5 is a flowchart illustrating image forming processing.

FIG. 4 illustrates blocks. Each of the blocks is a group of Nb (8 in this embodiment) squares surrounded by a rectangle indicated by a thick line. Each of the squares indicates a pixel. A number stored in a pixel indicates a gradation value of an ink color (for example, black).

The blocks are used as pseudo-pixels in processing described below. Data compression is performed using each block of each ink color as a unit.

Subsequently, whether or not an edge is included in a block (which will be hereinafter referred to as a block of interest) which is focused on (S420). S420 in this embodiment is executed depending on whether or not an expression below is satisfied.

(Maximum gradation value−Minimum gradation value)≥Threshold      Expression 1

The threshold is 100 in this embodiment.

Looking at a block B1 indicated by FIG. 4, the maximum gradation value is 243, and the minimum gradation value is 240. Therefore, Expression 1 is not satisfied and it is determined that an edge is not included. On the other hand, looking at a block B2, the maximum gradation value is 255 and the minimum gradation value is 3. Therefore, Expression 1 is satisfied and it is determined that an edge is included.

If an edge is not included (NO in S420), a flag is set off (S430). With this flag set off, it is indicated that an edge is not included. The data amount of the flag is 1 bit.

Subsequently, a representative value of a block is determined (S435). The representative value in this embodiment is calculated using a total sum average of gradation values included in the block. When merely the term "average" is used below, the term means the total sum average. For the representative value, if the average includes a figure of a decimal point or less, the average is rounded off by a decimal point or less to obtain an integral value. For example, looking at the block B1, the average is 240.625, and therefore, the representative value is 241. As described above, the gradation values of the Nb pixels are represented by one representative value, and thereby, a data amount that indicates a gradation value per block is compressed from 8 Nb bits to 8 bits.

Subsequently, based on the representative value, a block gradation value is determined (S440). Conversion from the representative value to a block gradation value is realized by referring to the compression LUT. However, the compression LUT has been prepared for each block position, and therefore, in S440, the compression LUT that corresponds to a position of a block that is focused on is used.

The position of a block is a relative positional relationship with a dither mask. Assuming that a size of the dither mask is 64 pixels×64 pixels, in a normal systematic dither method, a threshold stored in the dither mask is used for each group of 64 pixels×64 pixels, and thereby, an arrangement of dots is determined. As described above, when it is assumed that a dither mask is used, which position in the dither mask each block is arranged is determined. This position is called the position of a block.

When the position of a block is determined, the threshold of the corresponding dither mask is determined, and therefore, it is possible to examine, for all of cases in which the representative value is 0 to 255, a halftone result when the gradation value of each of all of pixels in the block is a representative value in advance. The compression LUT is generated based on the examination result.

Figure 7:
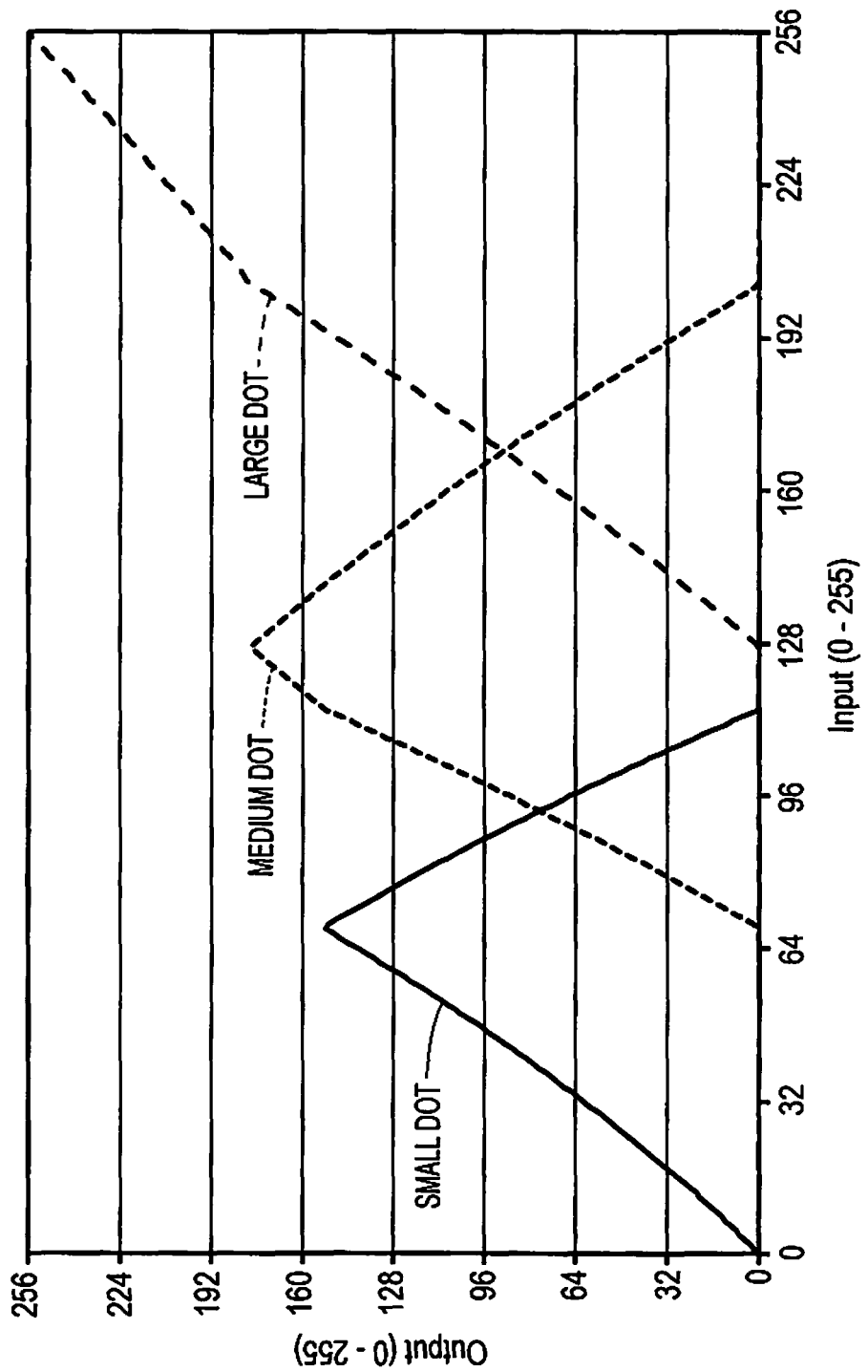
FIG. 7 is a graph illustrating a large, medium, and small dot density conversion table.

Steps of generating the compression LUT will be described. By referring to a large, medium, and small dot density conversion table, an ink color component: DATA of an integer value in a range of 0 to 255 is converted to density data: L_DATA, M_DATA, and S_DATA in accordance with a dot size, that is, large, medium, or small. FIG. 7 illustrates the above-described large, medium, and small dot density conversion table by a graph. This conversion is represented by expressions as follows.

$$L\_DATA = L\_tbl(DATA)$$

$$M\_DATA = M\_tbl(DATA)$$

$$S\_DATA = S\_tbl(DATA)$$

Similar to ink color data, each of large density data, medium density data, and small density data takes an integer value in a range of 0 to 255. Therefore, the data amount is 8 bits. If the use rate of small dots is close to 100%, resistance to displacement of a dot impact position or the like is reduced, and therefore, as illustrated in FIG. 7, the maximum density of small dots is kept around 60%.

Assume that a dither mask threshold (an integer in a range of 0 to 254) of an examination target pixel is THi. In this case, assuming that LM_DATA=L_DATA+M_DATA and T_DATA=LM_DATA+S_DATA, a halftone result when input data is DATA is 4-valued into large, medium, small, or off in accordance with the following idea.

If L_DATA>THi, a large dot is on.
If L_DATA≤THi<LM_DATA, a medium dot is on.
If LM_DATA≤THi<T_DATA, a small dot is on.
IF T_DATA≤THi, a dot is OFF.

When, for the dither mask threshold: TH0 to TH7 of 8 pixels in positions in an examination target block, the halftone result of each of all of cases in which the DATA value is 0 to 255 is examined in advance, the dot arrangement in the block when all of the pixels in the block have all the same DATA value is clearly known.

FIG. 9 illustrates a threshold used for each pixel position of a block of interest. The printer 200 stores a general dither mask used for the systematic dither method. The thresholds illustrated in FIG. 9 indicate thresholds in part of the dither mask, which are used for the block of interest. Note that the contents of FIG. 9 are also used for describing determination of dot arrangement using the decompression LUT (which will be described later).

In the example of FIG. 9, the dither mask thresholds in the positions in the block of an examination target are TH0=2, TH1=166, TH2=241, TH3=19, TH4=101, TH5=114, TH6=8, and TH7=59.

Based on the examination result for this case, when input DATA increases one by one from 0 to 255, how the dot arrangement in the block and a combination of the respective numbers of generated large, medium, and small dots in the corresponding block accordingly change is tabulated. The dot arrangement in the block is an on or off result of each of large, medium, and small dots for respective pixel positions of TH0 to TH7. Furthermore, a table illustrated in FIG. 8 is generated for the block positions by counting, as a block gradation value, in which step of change the dot arrangement is.

A part of the table illustrated in FIG. 8 which corresponds to REPRESENTATIVE VALUE to BLOCK GRADATION VALUE is a compression LUT. By referring to the compression LUT, a representative value may be converted to a block gradation value.

FIG. 8 illustrates that, as the representative value increases one by one from 0 to 255, the block gradation value changes in 22 steps from 0 to 21. In this case, if the representative value is a (one of values of 0 to 255), it is indicated that a is input in all of the pixels in the block. Also, if the block gradation value changes in 22 steps, it is indicated that, in the target block, there are 22 patterns of combinations of large, medium, and small dots. Furthermore, in accordance with a method of this embodiment, the dot arrangement in the block, which corresponds to the block gradation value, is determined to be only one dot arrangement, and therefore, the dot arrangement itself changes in 22 steps.

The table illustrated in FIG. 8 may be used also for the purpose of obtaining a final halftone result from the block gradation value. The final halftone result is a dot arrangement in the block. In that case, a correspondence relationship of the block gradation value with a dot on or off result for pixel positions of 4 pixels in each of upper and lower arrays, that is, 4×2=8 pixels in total, may be referred to.

The compression LUT of this embodiment depends on the dither mask thresholds in the block, and therefore, is prepared for each position in the block. In this case, the maximum value of the block gradation value also depends on the dither mask thresholds in the block, and therefore, might differ in every block.

For example, if an examination is similarly performed on a case in which TH0=240, TH1=65, TH2=120, TH3=90, TH4=17, TH5=168, TH6=212, and TH7=30, the block gradation value changes in 20 steps from 0 to 19 and, when the block gradation value is 19, the dot on or off result is large dot on for all of 8 pixels in the block.

On the other hand, it is one combination of six large dots and one medium dot that corresponds to the block gradation value 19 in the exemplary table of FIG. 8. As described above, a dot combination which corresponds to the block gradation value depends on the dither thresholds in the block, and therefore, even when the block gradation value is the same, the halftone result might differ depending on a position of the block.

The maximum value of the block gradation value depends on the large, medium, and small dot density conversion table illustrated in FIG. 7 and, when a large, medium, and small dot density conversion table which has a complex characteristic is used, the maximum value of the block gradation value might be large. However, if the number of pixels that form one block is 8, when a large, medium, and small dot density conversion table which has a practical characteristic is used, there is not a case in which the maximum value of the block gradation value exceeds 31. Therefore, it is sufficient to assign 5 bits as the block gradation value.

If a case in which the maximum value of the block gradation value exceeds 31 occurs, the dither mask or the large, medium, and small density conversion table may be corrected, such that, as a result, the maximum value of the block gradation value is 31 or less to cope with the case.

As has been described above, the block gradation value of this embodiment may be expressed by a data amount of 5 bits. Because the data amount of the representative value, which has been determined above, is 8 bits, the data amount is further compressed. Therefore, the data amount of the block gradation value is smaller than 8 Nb bits, which is used for expressing the gradation values of the Nb pixels. Furthermore, the data amount of the block gradation value is smaller than the data amount (8 bits) which is used for expressing the gradation value of one pixel. As described above, if there is not an edge in the block, the data amount of a flag is added to the compressed data, resulting in a data amount of 6 bits.

Even when a data amount is compressed in the above-described manner, large deterioration of quality of a printed material may be reduced. This will be described later in description of image forming processing.

On the other hand, if an edge is included (YES in S420), a flag is set on (S442). Next, pixels included in a block of interest are classified into an H value group and an L value group (S445).

The H value group is a group that is formed by pixels (which will be hereinafter referred to as H value pixels) each of which has a gradation value that is classified, when gradation values of a pixel group that forms a block are divided into two groups of a high value and a low value, into the high value. On the other hand, the L group is a group that is formed by pixels (which will be hereinafter referred to as L value pixels) each of which has a gradation value that is classified into the low value.

In this embodiment, as criteria for classification into the H value group and the L value group, an average between the maximum gradation value and the minimum gradation value is used. For example, in the block B2 illustrated in FIG. 4, an average between the maximum gradation value 255 and the minimum gradation value 3 is 129. Therefore, 3 pixels of the gradation value 255 are classified into the H value group. The H value group, as a matter of course, includes a pixel of the maximum gradation value. On the other hand, pixels of the gradation values 3, 5, 12, and 15 are classified into the L value group. The L value group, as a matter of course, includes a pixel of the minimum gradation value. If the gradation value matches the average, the gradation value is classified into the H value group in this embodiment. In another embodiment, the gradation value that matches the average may be classified into the L value group.

Next, the positions of the H value pixels are stored (S450). Information that is stored in S450 will be hereinafter referred to as positional information. As the positional information, 1, which indicates the H value pixel, or 0, which indicates the L value pixel, is stored for each pixel. Therefore, the data amount of the positional information is Nb bits.

Next, a representative value of the H value group is determined (S460). The representative value of the H group in this embodiment is calculated as an average of the gradation values of the H value pixels.

Subsequently, a block gradation value of the H value group is determined (S470). A determination method in S470 is the same as that in S440.

Next, a representative value of the L value group is determined (S480). The representative value of the L value group in this embodiment is calculated as an average of the gradation values of the L value pixels.

Subsequently, a block gradation value of the L value group is determined (S470). A determination method in S470 is the same as that in S440.

As describe above, if there is an edge, information of a flag, positional information, and two block gradation values is generated. Therefore, a total 1+2Db+Nb bits is achieved. Db indicates the data amount of a block gradation value. In this embodiment, Db is 5 bits, and therefore, the data amount of the block which includes an edge is 19 bits.

After S440 or S490, whether or not processing has been performed on all of blocks is determined (S495). If there is an unprocessed block (NO in S495), the process returns to S410. If all of blocks have been processed (YES in S495), data compression processing is terminated. Data that has been processed in the above-described manner is compressed data.

In compressed data, an average Dc2 of the data amount for every Nb pixels is represented by an expression below.

$$Dc2 = \text{Ink}\{(Db+1) + E(2Db + Nb + 1)(1-E)\} \qquad \text{Expression 2}$$

Ink indicates the number of ink colors (4 in this embodiment) and E indicates a percentage of blocks which do not include an edge. To give a specific number as an example, assuming that E is 90%, Dc2 in Expression 2 is 29.2 bits.

The data amount of image data is 24×8=192 bits for every 8 pixels. Therefore, a compression rate achieved by data compression processing is about 6.6. The compression rate depends on each of values of Db, E, Nb, and Ink in accordance with Expression 2. Db, Nb, and Ink are design values. E is a value which depends on image data, a value of Nb, a shape of a block, and a method for determining whether or not there is an edge.

As has been described with reference to FIG. 3, compressed data is generated by two-step compression including a step of determining a representative value and a step of converting the representative value to a block gradation value. Therefore, it is understood that the representative value is a first compressed gradation value and the block gradation value is a second compressed gradation value. It is also understood that data including the representative value and the positional information is first compressed data and data including the block gradation value and the positional information is second compressed data. However, in this embodiment, when merely the term "compressed data" is used, the term means the second compressed data.

The compression rate of the first compressed data will be examined below. In the first compressed data, an average value $Dc1$ of a data amount per pixel group that forms one block is represented by an expression below.

$$Dc1 = \text{Ink}\{(8+1)E + (2 \times 8 + Nb + 1)(1-E)\}\qquad \text{Expression 3}$$

Assuming that E is 90%, Dc1 in Expression 3 is 42.4 bits. Therefore, the compression rate of the first compressed data is about 4.5. The compression rate achieved by a first step compression depends on each of values of E, Nb, and Ink in accordance with Expression 3.

When E=0 is substituted in Expression 3, Dc1=100 bits is achieved. Therefore, even when E=0, the above-described average Dc1 is smaller than 196 bits. That is, even when E=0, the above-described average Dc1 is compressed to be smaller than the data amount per pixel group that forms one block in the image data.

Next, with reference to FIG. 5, image forming processing will be described. With reception of compressed data as a trigger, image forming processing is executed by the CPU 210.

First, halftone processing (which will be described later) is executed (S500). Subsequently, with dot data obtained by halftone processing as a target, interlace processing is executed (S800) and image formation is executed (S900).

Figure 6:
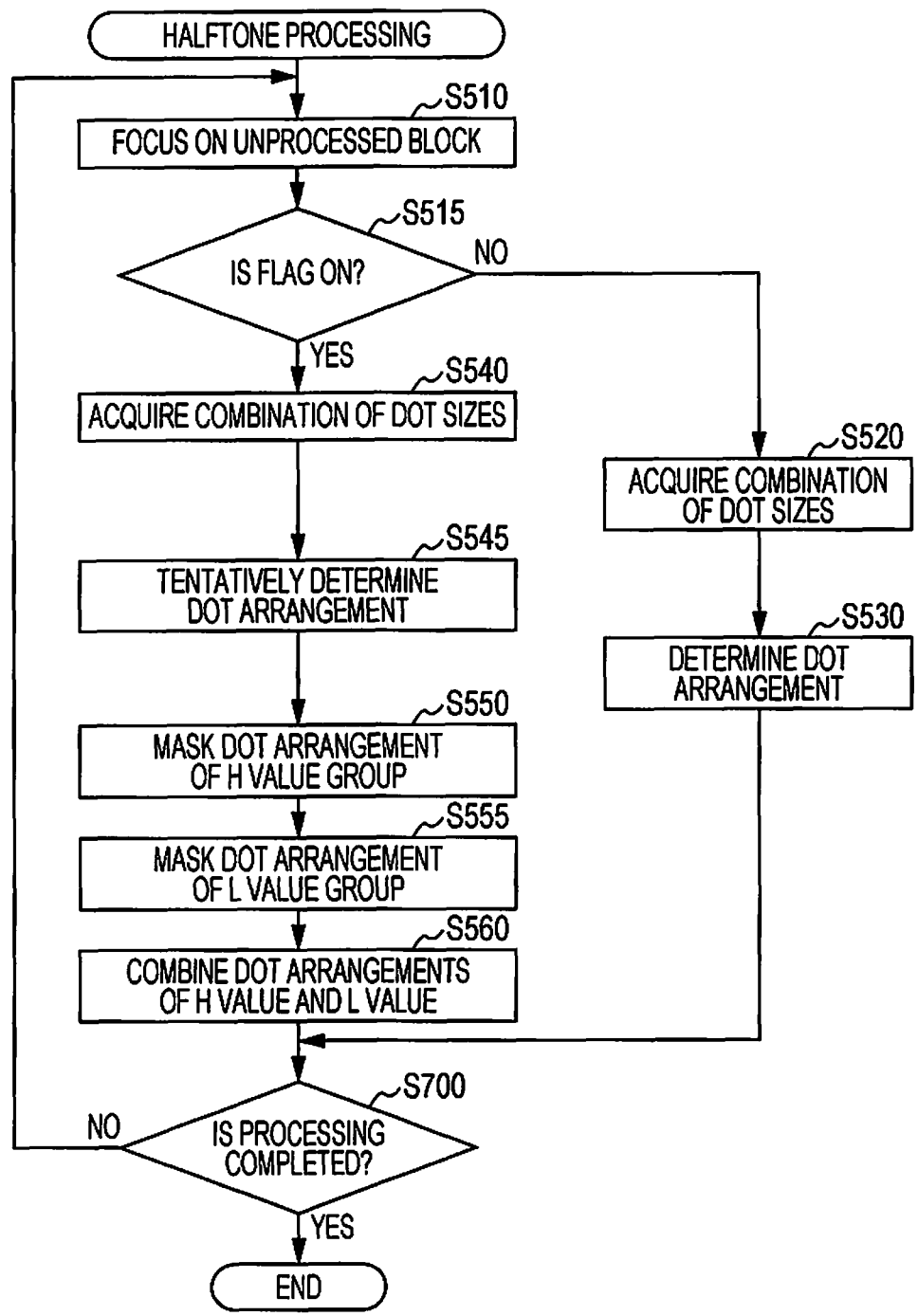
FIG. 6 is a flowchart illustrating halftone processing.

FIG. 6 is a flowchart illustrating halftone processing. First, one of unprocessed blocks is focused on (S510). Processing of S510 is similar processing to that of S410.

Subsequently, whether or not a flag is on is determined (S515). If a flag is off (NO in S515), a dot size combination is achieved from the block gradation values of the block of interest (S520).

The printer 200 stores, among the contents of the table illustrated in FIG. 8, a relationship between the block gradation value and the dot size combination for each of positions in the block. These are as a whole called decompression LUT.

When block gradation values and positions of a block are given, using the compression LUT, a combination of the respective numbers of dots of different sizes, that is, dot sizes, may be achieved.

Next, a dot arrangement in the block of interest is determined (S530) and the process proceeds to S700. In S530, the dot size combination which has been achieved in S520 and a dither mask are used.

For example, when the dot size combination is three large dots, one medium dot, and one small dot, large dots are arranged in pixels which have the smallest value, the second smallest value, and the third smallest value of the values of the thresholds, a medium dot is arranged in a pixel which has the next smallest value, and a small dot is arranged in a pixel which has the further next smallest value. In the example of FIG. 9, large dots are arranged in pixels of thresholds 2, 8, and 19, a medium dot is arranged in a pixel of a threshold 59, and a small dot is arranged in a pixel of a threshold 101.

Originally, the dither mask is used for determining whether or not a dot is formed by comparing a stored threshold and the gradation value of each pixel in image data to one another. In one view, it may be understood that the thresholds stored in the dither mask indicate the order of priorities for dot formation. That is, it may be understood that the systematic dither method is a method in which a dot is formed preferentially in a pixel having a smaller numerical value as the threshold of the dither mask. In S530, this characteristic is used.

FIG. 10 illustrates dots arranged in a manner described above. L indicates a large dot, M indicates a medium dot, and S indicates a small dot. Note that the combination of three large dots, one medium dot, and one small dot does not exist in the table of FIG. 8. However, to describe a most complex case in which large, medium, and small are on at the same time, this combination has been given as an example.

One the other hand, when a flag of the block of interest is on (YES in S515), a dot size combination is acquired for each of the block gradation value of the H value group and the block gradation value of the L value group (S540). An acquisition method is the same as that in S520.

Subsequently, for each of the H value group and the L value group, a dot arrangement is determined (S545). A determination method is the same as that in S530.

Next, the dot arrangement of the H value group is masked using positional information (S550). To describe masking, it is assumed that the dot arrangement illustrated in FIG. 10 is the dot arrangement of the H value group. It is also assumed that the positions of the H value group are three positions of the gradation value 255, which are included in the block B2 illustrated in FIG. 4. The dot arrangement of the H value group illustrated in FIG. 10 is a result that has been achieved by arranging dots using the thresholds illustrated in FIG. 9 when the dot size combination is two large dots, one medium dot, and one small dot.

FIG. 11 is a view illustrating masking of the H value group. As illustrated in FIG. 11, in the H value group, dots in pixels in which 1 is stored in the positional information are left and dots in pixels in which 0 is stored in the positional information are deleted. As a result, one large dot and one small dot remain. This operation is called masking in this embodiment.

Next, the dot arrangement of the L value group is masked using the positional information (S555). To describe masking, it is assumed that the dot arrangement illustrated in FIG. 12 is a dot arrangement of the L value group. It is also assumed that the positions of the L value group are positions of other gradation values than the gradation value 255, which are included in the bock B2 illustrated in FIG. 4. The dot arrangement of the L value group illustrated in FIG. 12 is a result that has been achieved by arranging dots using the thresholds illustrated in FIG. 9 when the dot size combination is no large dot, no medium dot, and three small dots.

FIG. 13 is a view illustrating masking of the L value group. As illustrated in FIG. 13, in the L value group, dots in pixels in which 0 is stored in the positional information are left and dots in pixels in which 1 is stored in the positional information are deleted. As a result, two small dots remain.

Subsequently, the dot arrangements of the H value group and the L value group are combined (S560) and the process proceeds to S700. FIG. 14 illustrates how the dot arrangements are combined.

As illustrated in FIG. 14, in a pixel in which a dot is arranged in one of the dot arrangement of the H value group after masking and the dot arrangement of the L value group after masking, the dot is arranged as it is also after the dot arrangements have been combined. On the other hand, in a pixel in which a dot is not arranged in either one of the dot arrangement of the H value group after masking and the dot arrangement of the L value group after masking, a dot is not arranged. Note that a pixel in which a dot is arranged in both of the dot arrangement of the H value group after masking and the dot arrangement of the L value group after masking does not exist because of the characteristic of mask.

In S700, whether or not processing for all of blocks is completed is determined. If there is an unprocessed block (NO in S700), the process returns to S510. If processing for all of blocks is completed (YES in S700), halftone processing is terminated. In the above-described manner, dot data that indicates a dot arrangement of each ink color is obtained for all of pixels by halftone processing. The dot arrangement is information that indicates whether or not a dot is formed for each pixel. The dot arrangement in this embodiment is information that indicates that a dot size if it is determined that a dot is formed.

In the dot data, an average Dh of the data amount per pixel group that forms one block is represented by an expression below. Ls in the expression blow indicates an operation result obtained by forming an integer by rounding up digits after the decimal point of log 2S.

$$Dh = Ink \times Nb \times Ls \qquad \text{Expression 4}$$

In this embodiment, Dh=4×8×2=64 bits. Therefore, the data amount of compressed data is smaller than the data amount of the dot data, depending on an E value. Note that, normally, the E value in image data is 90% or more, and therefore, the data amount of compressed data is smaller than the data amount of the dot data.

According to this embodiment, at least advantages below may be achieved.

(a) A processing load for obtaining dot data from image data is small. This is because, after a representative value is determined, a dot arrangement may be determined or tentatively determined only by referring to a compression LUT, a decompression LUT, and a dither mask.

(b) If there is an edge in a block, two dot arrangements which have been tentatively determined are combined to determine a dot arrangement, and therefore, deterioration of image quality is reduced.

(c) Determination of a block gradation value and acquisition of a dot arrangement using the block gradation value may be executed by the data compression device 100 and the printer 200, respectively. Therefore, a processing load of the data compression device 100 may be reduced. Furthermore, an image forming speed is hardly reduced.

(d) Compressed data having a smaller data amount than that of image data is transferred, and therefore, a probability that a transfer speed is a bottleneck of an image forming speed is reduced. If a transfer speed is a bottleneck of an image forming speed, the image forming speed is increased.

(e) Compressed data is transferred, and therefore, only a small storage capacity is used for spooling.

Second Embodiment

A second embodiment will be described with a focus on a different point from the first embodiment described above. Contents that will be not particularly described are the same as the corresponding contents in the first embodiment. Note that each of third and subsequent embodiments will be also described with a focus on a different point from the first embodiment described above and contents that will be not particularly described are the same as the corresponding contents in the first embodiment.

In the second embodiment, only one dot size is used. That is, S=2. In the second embodiment, the size of a block is 4 pixels×4 pixels=16 pixels.

Data compression processing in the second embodiment will be described. In the second embodiment, a block gradation value is represented in 17 gradations from 0 to 16. Therefore, the data amount of the block gradation value is 5 bits.

FIG. 15 illustrates gradation values of an ink color in image data. FIG. 15 illustrates one block extracted from the entire image data.

In the example of FIG. 15, the maximum gradation value is 210 and the minimum gradation value is 10, and therefore, it is determined that there is an edge (YES in S420). An average between the maximum gradation value and the minimum gradation value is 110. L value pixels are hatched. An average of gradation values of the H value group is 206.25. An average of gradation values of the L value group is 11.75.

Note that an average of gradation values of all of pixels is 109. The average for all of the pixels will be used in description below for comparison with a known method.

In S470 and S490, to convert each of the above-described averages to a block gradation value represented in 17 gradations from 0 to 16, each of the values of the averages, which have been described above, is multiplied by $16/255$ to form an integer. However, when an integer is formed by simply rounding off or the like, a pseudo outline resulting from reproduction in only 17 gradations occurs.

In this embodiment, to reduce the pseudo outline as much as possible, a random number: rand ( ) of 0 or more and less than 1 is generated for each block and, after adding the random number to the average, an integer is formed by rounding off by a decimal point or less. For example, assume that a rand ( ) value of this block is 0.324. Assuming that an operator that is used for forming an integer by rounding off by a decimal point or less is written as INT ( ), the H value group and the L value group are calculated as follows.

$$H \text{ value group} = INT(206.25 \times 16/255 + 0.324) = 13$$

$$L \text{ value group} = INT(11.75 \times 16/255 + 0.324) = 1$$

Note that, when a similar calculation is performed using the average 109 for all of the pixels, the following result is obtained.

The gradation value of the entire block $$= INT(109 \times 16/255 + 0.324) = 7$$

Next, halftone processing in this embodiment will be described. In this embodiment, instead of S520 and S540, a dot arrangement is achieved using a density pattern method.

The resolution of image formation performed by the printer 200 is 1200 dpi, and therefore, instead of enabling reproduction in 17 gradations using the block gradation value, the resolution is reduced to ¼ both in row and column directions. Therefore, image formation in which reproduction in 17 gradations at 300 dpi is possible may be enabled.

FIG. 16 illustrates a relationship between gradation values and a density pattern. A pixel in which a dot is formed is a pixel in which a number of the block gradation value or less is stored. That is, in a pixel in which a smaller number is stored, a dot is preferentially generated. In this embodiment, a dot concentration type is employed.

FIG. 17 illustrates that, when the block gradation value is 1, a single dot is generated. A circle is marked in a pixel in which a dot is generated. The pixel in which a dot is generated is a pixel in which 1 is stored as a threshold. Because a dot concentration type is employed, pixels in which 1 to 4 are stored as thresholds are pixels located in an inner side. The pixels located in an inner side are 4 pixels that are not adjacent to another block.

FIG. 18 illustrates that, when the block gradation value is 2, two dots are generated. A pixel in which a dot is generated is a pixel in which a number 2 or less is stored as a threshold.

FIG. 19 illustrates that, when the block gradation value is 3, three dots are generated. A pixel in which a dot is generated is a pixel in which a number 3 or less is stored as a threshold.

FIG. 20 illustrates that, when the block gradation value is 14, 14 dots are generated. A pixel in which a dot is generated is a pixel in which a number 14 or less is stored as a threshold.

Figures 21, 22, 23:
FIG. 21 is a view illustrating dots that occur when the gradation value is 15.
FIG. 22 is a view illustrating dots that occur when the gradation value is 16.
FIG. 23 is a view illustrating how dot arrangements are combined (the second embodiment).

FIG. 21 illustrates that, when the block gradation value is 15, 15 dots are generated. A pixel in which a dot is generated is a pixel in which a number 15 or less is stored as a threshold.

FIG. 22 illustrates that, when the block gradation value is 16, 16 dots are generated. A pixel in which a dot is generated is a pixel in which the number 16 or less is stored as a threshold. That is, a dot is generated in each of all of the pixels.

Note that it is understood that FIG. 16 is a view illustrating that, when the block gradation value is 0, a dot is not generated at all.

FIG. 23 illustrates how the dot arrangements of the H value group and the L value group are combined (S560). A circle is marked in a pixel in which a dot is formed. A pixel which is masked is hatched.

FIG. 24 illustrates, as a comparison example, a dot arrangement when the gradation values of the entire block are used. When FIG. 15, FIG. 23, and FIG. 24 are compared to one another, in a dot arrangement according to this embodiment, image reproducibility is higher than that in the dot arrangement of the comparative example.

Third Embodiment

FIG. 25 illustrates an outline of a printer 20a. The printer 20a executes color conversion (S300) and a data compression program (S400), and thereby, functions in stand-alone, similarly to the image forming system 20. Thus, the printer 20a forms an image forming system in a broad sense. Furthermore, the printer 20a functions as a data compression device or a data compression system. Note that a data compression processing program and an image forming processing program are collectively called image forming program.

Fourth Embodiment

In this embodiment, the data amount of positional information is Nb−1 bits. Even when the positional information of this embodiment is used, image formation may be executed in a similar manner to that described in the first embodiment.

An outline of the positional information of this embodiment is as follows. After one block is divided into the H value group and the L value group, the same group as that of a pixel position 0 and a different group from that of the pixel position 0 are handled as a G0 group and a G1 group, respectively. As a representative pixel, the pixel position 0 is determined to be a proper pixel position, such as a pixel located in an upper left part in a block or the like, in advance. If it is stored in the printer 200 in advance that the pixel position 0 belongs to the G0 group, it is not necessary to include information about the pixel position 0 in the positional information.

Note that the positional information in this embodiment does not directly indicate information (which will be hereinafter referred to as identification information) which indicates which one of the G0 group and the G1 group is the H value group and which one of the G0 group and the G1 group is the L value group. However, even when the identification information is not indicated, combining (S560) of dot arrangements in halftone processing may be executed. Specifically, for one of the G0 group and the G1 group, as described as S550 of the first embodiment, when a pixel which belongs to the other group is masked, the same result as that in the first embodiment may be achieved.

In the first embodiment, the identification information is included in the positional information and also it is not necessary to mask the L value group, and therefore, a step of masking a dot arrangement using the L value group is not provided. As a matter of course, in the first embodiment, masking for the L value group may be executed, too. Although, in the description of the first embodiment, the positional information has been described as information that indicates the position of an H value pixel, as a matter of course, the positional information is also information that indicates the position of an L value pixel.

Note that, also in this embodiment, the H value group and the L value group may be distinguished from one another and different processing may be executed on each of the H value group and the L value group. Even when the identification information is not included in the positional information, the identification information may be obtained from the block gradation value. That is, as illustrated in FIG. 8, a relationship between the block gradation value and the representative value in this embodiment is a relationship of monotonous increase in a broad sense, and therefore, it is understood that, when the block gradation value of G0 and the block gradation value of G1 are compared to one another, if the former is larger, the G0 group is the H value group, and if the latter is larger, the G1 group is the H value group.

Fifth Embodiment

In this embodiment, it is not distinguished whether or not there is an edge in a block. That is, in data compression processing, determination of S420 is eliminated and S445 to S490 are executed for all of blocks. Therefore, a flog is not needed. In halftone processing, determination in S515 is eliminated and S540 to S560 are executed for all of blocks.

Note that, assuming that all of pixels in the block have the same gradation value, if a pixel in which the gradation value is an average value or more is classified in the H value group in S445, all of pixels are classified into the H value group, and therefore, subsequent processing for the L value group may be omitted. If not omitted, the dot arrangement of the L value group is not reflected in any pixel when combining the dot arrangements of the H value group and the L value group, and therefore, the representative value of the L value group may be processed as a proper value, that is, for example, 0 or the like.

In the compressed data in this embodiment, the average Dc2 of the data amount per image group that forms one block is represented by an expression below.

$$Dc2=\text{Ink}(2Db+Nb) \quad \text{Expression 5}$$

When the same numerical value as that in the first embodiment is substituted, 4×(2×5+8)=72 bits. As described above, the compressed data is compressed to be smaller than image data, but is larger than 64 bits, which is an average Dh of the data amount for dot data. Therefore, as a modified example of the fifth embodiment, processing up to generation of dot data may be executed by the data compression device 100 and generated dot data may be transmitted to the printer 200.

However, when the data compression device 100 executes processing up to generation of dot data, a processing load of the data compression device 100 is excessively increased, and thereby, a time which it takes to obtain a printed material might be increased. In contrast, in this embodiment, similar to the first embodiment, advantages that are achieved by transferring compressed data may be enjoyed. The advantages that are achieved by transferring compressed data are mainly (c), (d), and (e), which have been described in the first embodiment.

Note that, as is evident from Expressions 4 and 5, a size relation between the data amount Dc2 and the average Dh depends on values of Db and Nb. If an expression below is satisfied, similar to the first embodiment, compressed data has a smaller data amount than that of dot data.

$$NbLs>2Db+Nb$$

$$\Leftrightarrow Ls-1>2Db/Nb \quad \text{Expression 6}$$

In accordance with Expression 6, when S=2, that is, when only one dot size is used, the inequality does not hold. Assuming S>2, for example, when S=4 is substituted in Expression 6, Nb>2Db. Therefore, for example, when Nb is 12 pixels (for example, 3 pixels×4 pixels) and Db is 5 bits, the inequality holds.

On the other hand, in a relationship between the average Dc1 of the data amount in the first compressed data and the data amount Dh in this embodiment, a condition under which Dh>Dc1 holds is represented by an expression below.

$$NbLs>2\times 8+Nb$$

$$\Leftrightarrow Ls-1>16/Nb \quad \text{Expression 7}$$

For example, when S=4 is substituted in Expression 7, Nb>16. Therefore, for example, when Nb is 18 (for example, 3 pixels×6 pixels) pixels, the inequality holds.

In this embodiment, as compared to the first embodiment, there is an advantage that conditional branches are reduced and processing is simplified by processing all of blocks in the same manner. Particularly, when processing is incorporated in hardware and thus processing of the L value group and processing of the H value group are executed in parallel, or the like, speed reduction is not caused and this embodiment is effective.

Note that a combination of the method of the first embodiment which is illustrated in FIG. 3 and in which data compression processing is performed by performing different processing between a block in which there is an edge and a block in which there is not an edge and the method of the fifth embodiment in which halftone processing is performed assuming that all of blocks are blocks in which there is an edge may be employed. In that case, for a block in which there is not an edge, in halftone processing, all of pixels may be regarded as the H value group and the representative value of the L value group may be caused to be a proper value, that is, 0 or the like. In accordance with this method, both of a high compression rate according to the first embodiment and a simple method that is suitable for incorporation in hardware according to the fifth embodiment may be achieved at the same time.

The present disclosure is not limited to the embodiments and the modified examples disclosed herein, but may be realized in various forms without departing from the gist of the present disclosure. For example, some or all of the technical features described in the embodiments and the modified examples, which correspond to technical features in aspects described in SUMMARY, may be replaced or combined with some or all of the technical features in order to solve some or all of the problems described above. Unless the technical features are described as essential technical features herein, the technical features may be deleted as appropriate. For example, the following are examples of the technical features.

When a plurality of block gradation values is determined for the same block, the number of values that are to be determined may be larger than two, which corresponds to the H value group and the L value group. However, the number Nt of values that are to be determined is preferably smaller than Nb (the number of pixels that form one block). That is, Nb>Nt is preferable. For example, when Nb=8, the number Nt of values may be fixed to Nt=3, and also, the number Nt of values may be caused to differ between when Nt=2 and when Nt=3 in accordance with the gradation value of image data in a block.

As described above, when Nt is changed to 3 or more, Expression 2 is generalized as follows. Ln in an expression below indicates an operation result obtained by forming an integer by rounding off by a decimal point or less of $\log_2 Nt$.

$$Dc2=\text{Ink}\{(Db+1)E+(NtDb+LnNb+1)(1-E)\} \quad \text{Expression 2A}$$

Similarly, Expression 3 is generalized as follows. In an expression below, the data amount (8 bits in the first embodiment) that expresses gradations of an ink color is written as Di.

$$Dc1=\text{Ink}\{(Di+1)E+(NtDi+LnNb+1)(1-E)\} \quad \text{Expression 3A}$$

Similarly, Expression 5 is generalized as follows.

$$Dc2=\text{Ink}(NtDb+LnNb) \quad \text{Expression 5A}$$

Similarly, Expression 6 is generalized as follows.

$$NbLs>NtDb+LnNb$$

$$\Leftrightarrow Ls-Ln>NtDb/Nb \quad \text{Expression 6A}$$

Similarly, Expression 7 is generalized as follows.

$$NbLs>NtDi+LnNb$$

$$\Leftrightarrow Ls-Ln>NtDi/Nb \quad \text{Expression 7A}$$

For comparison with image data, the following applies. Assuming that the data amount per pixel in image data is Dp (24 in this embodiment) bits, if, when whether or not there is an edge in a block is not distinguished, an expression below is satisfied, compressed data has a smaller data amount than that of the image data.

$$DpNb>\text{Ink}(NtDb+LnNb) \quad \text{Expression 8}$$

If, when whether or not there is an edge in a block is not distinguished, an expression below is satisfied, data obtained by compression in the first step has a smaller data amount than that of the image data.

$$DpNb > \text{Ink}(NtDi + LnNb) \quad \text{Expression 9}$$

In addition to the above-described modified example, another modified example will be described.

Data that is obtained by compression in the first step may be a transfer target. That is, the representative values of the H value group and the L value group and the positional information may be transferred. When this modified example is applied to the fourth embodiment, as a matter of course, the printer 200 is able to obtain identification information also by using representative values.

A method for determining whether or not there is an edge and a method for classifying a pixel into the H value group or the L value group may be changed as appropriate. For example, as a method for classifying a pixel into the H value group or the L value group, a fixed value (a gradation value 128) may be used as a threshold.

A representative value may be determined by some other method than a method using the total sum average. For example, a geometrical mean, a median, or a most frequent value may be used. As another option, a highest gradation value in the block may be used as the representative value of the H value group, and a lowest gradation value in the block may be used as the representative value of the L value group.

Instead of determining, after determining the representative value, the block gradation value, the block gradation value may be obtained per a plurality of pixels, then, the representative value of a plurality of block gradation values may be determined, and thereby the respective block gradation values of the H value group and the L value group may be determined.

A dot arrangement is tentatively determined from a combination of the numbers of dots (S530, S540), and therefore, there may be a case in which a dither mask or the density pattern method is not used. For example, dots may be arranged at random.

Based on the block gradation value, a method for tentatively determining a dot arrangement (S540, S550 in the first embodiment) may be changed. For example, by referring to a LUT once, a dot arrangement may be tentatively determined from the block gradation value. The LUT is prepared for each of positions in a block and corresponds to a part of FIG. 8, which corresponds to the REPRESENTATIVE VALUE, UPPER 4 PIXEL DOT ARRANGEMENT, and LOWER 4 PIXEL DOT ARRANGEMENT, and a block gradation value is associated with a dot arrangement. In this modified example, although the data amount of a decompression LUT is increased, the speed of processing performed for a dot arrangement is increased.

As another method for tentatively determining a dot arrangement, by referring to a LUT once, the block gradation value may be converted to on dot number correspondence data which indicates a combination of on dot numbers of the large, medium, and small dot sizes, the respective on dot numbers of the large, medium, and small dot sizes may be obtained from the on dot number correspondence data, and then, S550, which has been described as an embodiment, may be executed. When Nb is 8, there are 165 combinations of the respective on dot numbers of three types of dots, that is, large, medium, and small dots. When an on dot number correspondence LUT in which the on dot number correspondence data from 0 to 164 and 165 different on dot number combinations are associated with one another in one-to-one correspondence is generated, the on dot number correspondence data may be restored to the on dot number data by referring to the on dot number correspondence LUT. The on dot number correspondence data may be stored with 8 bits, and therefore, the data size may be reduced as compared to a case in which the on dot number data of the three types of dots, that is, the large, medium, and small dots, is directly described.

The data amount of the block gradation value may be changed, as appropriate. For example, the data amount of the block gradation value may be changed in accordance with the number of pixels which form a block. When 16 pixels are included in one block, in almost all cases, the maximum value of the block gradation value is 63 or less. In this case, the data amount of the block gradation value is sufficient with 6 bits. Also, when 4 pixels are included in one block, in almost all cases, the maximum value of the block gradation value is 15 or less. In this case, the data amount of the block gradation value is sufficient with 4 bits.

Although, in the first embodiment, after converting all of blocks to second compressed data, halftone processing in which a final dot arrangement is obtained is executed, a processing unit for these processes may be set to be a smaller block number. For example, after performing conversion to second compressed data on units of all of blocks in a row direction and one block in a column direction, halftone processing may be executed. Also, in this case, the advantages (a) to (e), which have been described in the first embodiment, are achieved.

Conversion to compressed data and halftone processing may be subsequently executed for every block as a processing unit. In this case, although the advantages (c) to (e) are lost, the advantages (a) and (b) are still achieved, and therefore, a sufficiently useful technology may be achieved.

Masking of the L value group may be omitted. In this case, the dot arrangement of the H value group after masking and the dot arrangement of the L value group which has not been masked are combined. Thus, a processing load is reduced. In a pixel in which a dot is arranged both in the dot arrangement of the H value group after masking and the dot arrangement of the L value group, a dot of an H value after masking is arranged. However, conditions of this method are that a continuous dither method is used for halftone processing and that the total number of the large, medium, and small dots monotonously increases relative to the block gradation value.

In each of the above-described embodiments, some or all of functions and a part or the whole of processing that are realized by software may be realized by hardware. Also, some or all of functions and a part or the whole of processing that are realized by hardware may be realized by software. As hardware, for example, various types of circuits, such as an integral circuit, a discrete circuit, a circuit module in which these circuits are combined, or the like, may be used.

As described in the first embodiment, in an embodiment in which the method for determining a dot arrangement is changed based on whether or not there is an edge, it may be temporarily regarded that there is an edge for all of blocks, a dot arrangement may be tentatively determined for each of the H value group and the L value group, and thereafter, if all of the pixels in the block belong to one of the H value group and the L value group, a dot arrangement may be determined by ignoring a tentative determination result for the other one of the H value group and the L value group to which no pixel belongs at all. Such a method is practical when the method is realized by hardware.

This application claims priority under 35 U.S.C. § 119 to Japanese Patent Application No. 2017-012912, filed Jan. 27, 2017. The entire disclosure of Japanese Patent Application No. 2017-012912 is hereby incorporated herein by reference.

What is claimed is:

1. An image forming system comprising:
at least one central processing unit configured to
classify at least one single block of blocks each of which is formed by Nb pixels included in image data into Nt (Nt is an integer that satisfies 2≤Nt<Nb) groups by using an average value of a highest gradation value of the Nb pixels of the at least one single block and a lowest gradation value of the Nb pixels of the at least one single block, or using a fixed gradation value, such that the Nt groups include a group including only a plurality of pixels each of which has a gradation value that is equal to or more than the average value or the fixed gradation value and a group including only a plurality of pixels each of which has a gradation value that is less than the average value or the fixed gradation value;
generate, for at least one of the Nt groups, positional information that is information indicating positions of pixels that form the at least one of the Nt groups;
determine Nt block gradation values for the at least one single block by determining the Nt block gradation values for the Nt groups of the at least one single block, respectively, in accordance with a data amount that is smaller than a data amount that is used for expressing gradation values of the Nb pixels for each of the Nt groups, based on each gradation value for each pixel forming each group and a position of the at least one single block;
tentatively determine, for each of the Nt groups, a dot arrangement that is information indicating whether or not a dot is formed for each of the Nb pixels that form the at least one single block, based on each of the Nt block gradation values;
determine, for the at least one single block, the dot arrangement using the tentatively determined dot arrangement and the positional information; and
form an image using the determined dot arrangement.

2. The image forming system according to claim 1, wherein the at least one central processing unit determines the block gradation value of each of the Nt groups, based on a representative value of gradation values stored in pixels that form the corresponding group.

3. The image forming system according to claim 1, wherein the at least one central processing unit tentatively determines the dot arrangement using an order of priorities for forming a dot for the pixels that form the at least one single block.

4. The image forming system according to claim 1, wherein a total of a data amount of the block gradation value and a data amount of the positional information is smaller than a data amount of the dot arrangement for the Nb pixels.

5. The image forming system according to claim 1, wherein, if an edge is not included in a block of the blocks, the at least one central processing unit does not execute the classifying, and
if an edge is not included in the block, the at least one central processing unit determines the dot arrangement, based on a block gradation value determined for the block.

6. The image forming system according to claim 5, wherein the at least one central processing unit is further configured to determine whether or not an edge is included in the block, based on gradation values stored in the pixels that form the block and comparison with a corresponding threshold that has been determined in advance.

7. The image forming system according to claim 5, wherein, if an edge is not included in a block of the blocks, the at least one central processing unit does not execute the tentative determining, and
if an edge is not included in the block, the at least one central processing unit regards the Nt as 1.

8. The image forming system according to claim 1, wherein the positional information indicates whether or not a pixel belongs to a group of the Nt groups to which a representative pixel belongs, for other pixels than the representative pixel among the pixels that form the at least one single block.

9. An image forming device comprising:
at least one central processing unit configured to
classify at least one single block of blocks each of which is formed by Nb pixels included in image data into Nt (Nt is an integer that satisfies 2≤Nt<Nb) groups by using an average value of a highest gradation value of the Nb pixels of the at least one single block and a lowest gradation value of the Nb pixels of the at least one single block, or using a fixed gradation value, such that the Nt groups include a group including only a plurality of pixels each of which has a gradation value that is equal to or more than the average value or the fixed gradation value and a group including only a plurality of pixels each of which has a gradation value that is less than the average value or the fixed gradation value;
generate, for at least one of the Nt groups, positional information that is information indicating positions of pixels that form the at least one of the Nt groups;
determine Nt block gradation values for the at least one single block by determining the Nt block gradation values for the Nt groups of the at least one single block, respectively, in accordance with a data amount that is smaller than a data amount that is used for expressing gradation values of the Nb pixels for each of the Nt groups, based on each gradation value for each pixel forming each group and a position of the at least one single block;
tentatively determine, for each of the Nt groups, a dot arrangement that is information indicating whether or not a dot is formed for each of the Nb pixels that form the at least one single block, based on each of the Nt block gradation values;
determine, for the at least one single block, the dot arrangement using the tentatively determined dot arrangement and the positional information; and
form an image using the determined dot arrangement.

10. An image forming method comprising:
classifying at least one single block of blocks each of which is formed by Nb pixels included in image data into Nt (Nt is an integer that satisfies 2≤Nt<Nb) groups by using an average value of a highest gradation value of the Nb pixels of the at least one single block and a lowest gradation value of the Nb pixels of the at least one single block, or using a fixed gradation value, such that the Nt groups include a group including only a plurality of pixels each of which has a gradation value that is equal to or more than the average value or the fixed gradation value and a group including only a plurality of pixels each of which has a gradation value that is less than the average value or the fixed gradation value;

generating, for at least one of the Nt groups, positional information that is information indicating positions of pixels that form the at least one of the Nt groups;

determining Nt block gradation values for the at least one single block, the Nt block gradation values being determined for the Nt groups of the at least one single block, respectively, in accordance with a data amount that is smaller than a data amount that is used for expressing gradation values of the Nb pixels for each of the Nt groups, based on each gradation value for each pixel forming each group and a position of the at least one single block;

tentatively determining, for each of the Nt groups, a dot arrangement that is information indicating whether or not a dot is formed for each of the Nb pixels that form the at least one single block, based on each of the Nt block gradation values;

determining, for the at least one single block, the dot arrangement using the tentatively determined dot arrangement and the positional information; and forming an image using the determined dot arrangement.

11. The image forming system according to claim 1, wherein
the position of the at least one single block corresponds to a relative positional relationship with a dither mask.

12. The image forming device according to claim 9, wherein
the position of the at least one single block corresponds to a relative positional relationship with a dither mask.

13. The image forming method according to claim 10, wherein
the position of the at least one single block corresponds to a relative positional relationship with a dither mask.

* * * * *